Oct. 26, 1937. E. G. STAUDE Re. 20,541

DELIVERY MECHANISM FOR PAPER BOX MACHINES

Original Filed Aug. 24, 1929 5 Sheets-Sheet 1

INVENTOR
EDWIN G. STAUDE
BY Paul Paul & Moore
ATTORNEYS

Oct. 26, 1937.

E. G. STAUDE

Re. 20,541

DELIVERY MECHANISM FOR PAPER BOX MACHINES

Original Filed Aug. 24, 1929 5 Sheets-Sheet 2

Oct. 26, 1937. E. G. STAUDE Re. 20,541

DELIVERY MECHANISM FOR PAPER BOX MACHINES

Original Filed Aug. 24, 1929 5 Sheets-Sheet 3

INVENTOR
EDWIN G. STAUDE
BY Van S. Pond & Moore
ATTORNEYS

Oct. 26, 1937. E. G. STAUDE Re. 20,541

DELIVERY MECHANISM FOR PAPER BOX MACHINES

Original Filed Aug. 24, 1929 5 Sheets-Sheet 4

INVENTOR
EDWIN G. STAUDE
BY Paul & Paul & Moore
ATTORNEYS

Oct. 26, 1937. E. G. STAUDE Re. 20,541

DELIVERY MECHANISM FOR PAPER BOX MACHINES

Original Filed Aug. 24, 1929 5 Sheets-Sheet 5

INVENTOR
EDWIN G. STAUDE
BY Paul, Paul & Moore
ATTORNEYS

Reissued Oct. 26, 1937

Re. 20,541

UNITED STATES PATENT OFFICE 20,541

DELIVERY MECHANISM FOR PAPER BOX MACHINES

Edwin G. Staude, Minneapolis, Minn.

Original No. 1,986,023, dated January 1, 1935, Serial No. 388,200, August 24, 1929. Application for reissue March 23, 1935, Serial No. 12,713

40 Claims. (Cl. 271—76)

This invention relates to machine or mechanisms for received glued and folded cartons or paper goods, in which the conveyor belt travels at a slower speed than the carton or paper articles, thereby causing the carton or paper articles to overlap, the extent of which overlap is controlled by the speed of the conveyor.

The primary object of this invention is to provide a flexible and yielding pressure means which engages the cartons in the region of the seam of the freshly glued cartons or paper articles, to keep the glued seams under pressure contact until the adhesive is set and have said means positively driven and capable of self-adjustment conformable to material of different thicknesses, or such variations of thicknesses of overlapping cartons, as will necessarily follow depending on the length of the carton and the distance that it is overlapped.

A further object is to provide a pressure device which shall be flexible and yielding to accommodate itself for different thicknesses of the overlapped cartons without causing any appreciable difference in the tension of the over-head pressure carrier belt.

A further object is to provide an over-head pressure carrier mechanism which shall be simple in construction and easily and quickly adapted for adjustment laterally across the face of the conveyor belt and also to adapt it for cartons of different lengths.

A further object is to provide a driving connection which will permit the adjustment of the top pressure carrier mechanism and still operate in fixed bearings which may be easily lubricated, and which will keep the top pressure mechanism in perfect alignment to prevent sagging.

Objects, features and advantages of the invention will appear from the following detailed description of the drawings, and in said drawings.

Figure 1:
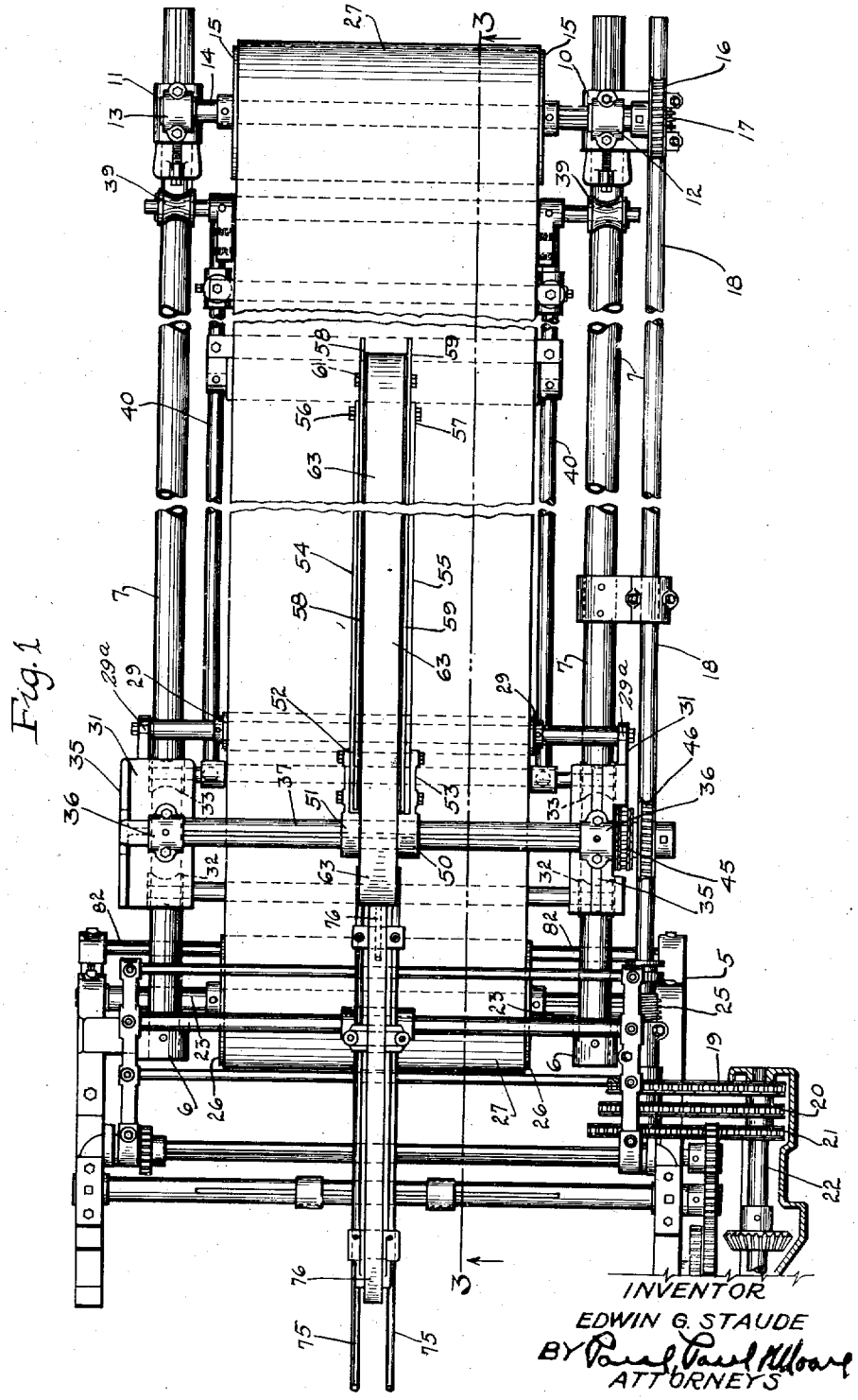
Figure 1 is a plan view of a delivery mechanism embodying my invention.

To enable the present invention to be understood, it will be unnecessary to illustrate or describe any particular type of box folding machinery, because the mechanism herein disclosed is suitable for use in connection with any machine which folds blanks into flat forms with overlapping adhesive flaps or glued seams.

The rear end of a folding box gluing machine is indicated by reference numeral 2, in which the delivery rolls 3 are usually mounted for delivering the carton in the flat to a suitable receiving mechanism.

To the legs 4 of the box gluing machine are attached brackets 5, which brackets in turn support brackets 6 which receive and support tubular frame elements 7. The elements 7 are supported medially by legs 8, see Figure 3, and are also supported at the outer ends by legs 9, see Figure 2. Mounted on the outer ends of the tubular frame elements 7 are suitable supports 10 and 11 having bearings 12—13 for receiving a cross shaft 14. Upon this shaft is mounted a drum 15. The shaft has a worm wheel 16 keyed thereto and meshing with the worm 17, keyed to shaft 18 which extends longitudinally at one side of the machine. Shaft 18 is driven through a speed-change mechanism in this instance giving three speeds. The driving mechanism is of the sprocket chain type, the chains being respectively indicated at 19—20—21. This sprocket type speed-change mechanism as applied to a machine of this type is believed to be new, and is considered a feature of the invention. Shaft 18 has three sprockets of different sizes, as shown, connected by the sprocket chains above mentioned, and corresponding sprocket wheels of shaft 22, which shaft is connected with a driving mechanism (not shown) of the folding box gluing machine, see Figure 1.

Supported by bracket 6 is a shaft 23 driven from shaft 18 by worm wheels 24—25. On the shaft 23 is mounted a drum 26. Mounted upon the drums 15—26 and driven thereby is a heavy canvas carrier or conveyor belt 27 of suitable width, to receive material to be conveyed, in this instance a glued carton.

Figure 3:
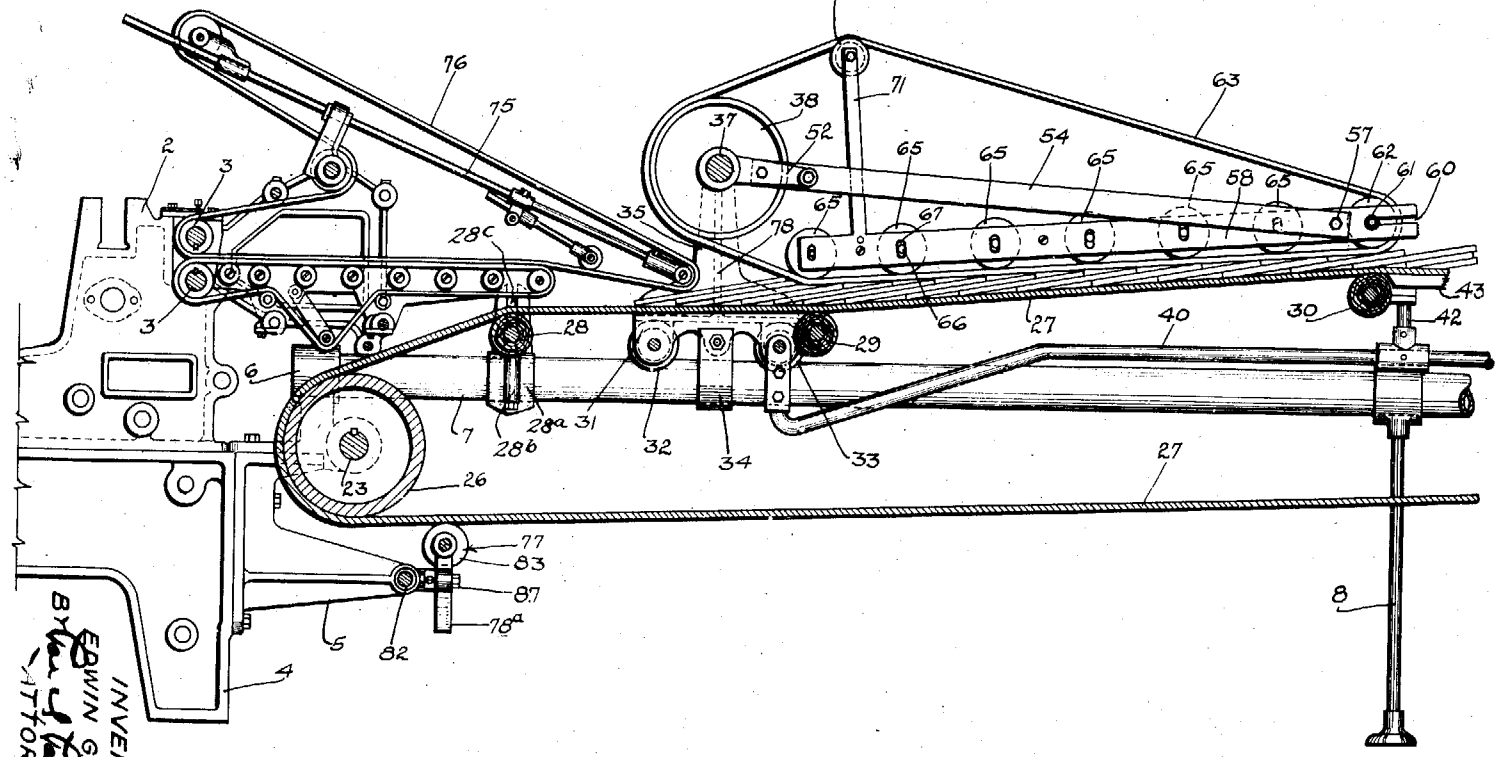
Figure 3 is a section substantially on line 3—3 of Figure 1, looking in the direction of the arrow.

To regulate the pitch of the receiving end of the conveyor there are provided transversely disposed idler rolls 28—29—30, see Figure 3, suitably mounted for adjustment in direction of feed. Upon and over the tubular frame elements 7 are mounted, one for each frame, castings 31 having rollers 32—33 engaging the surfaces of said elements and rolling therealong. This pitch regulation is for the purpose of adjusting for cartons of different lengths. The frame and the rolls 32 and 33 are prevented from rising by means of clips 34, see Figure 3.

Each member 31 is provided with an upright portion 35, topped by a bearing 36 adapted to receive the drive shaft 37, to which is splined a pulley 38. Towards the rear of the conveyor, I provide a pair of rollers 39, see Figure 2, having concaved surfaces traveling over the tubular frame 7. These rollers are suitably mounted and their mountings are connected with corresponding members 31 by irregular shaped rods 40. The rods 40 support suitable posts 41 and 42, which, in turn, support a flat table 43 and the roll 39. The flat table 43 is adapted to bear on the under surface of the conveyor belt 27, and support the conveyor belt in a horizontal plane.

Figure 4:
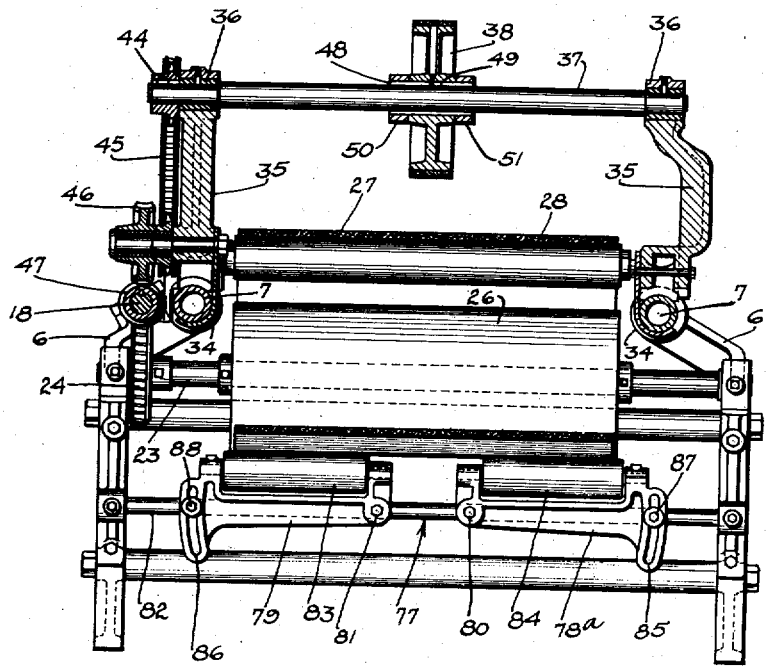
Figure 4 is a cross section substantially on line 4—4 of Figure 2, looking in the direction of the arrow.

The shaft 37 is positively driven by a sprocket 44 (see Figure 4) and the sprocket chain 45 which passes over a suitable sprocket mounted on the hub of the worm wheel 46. The worm wheel 46 is driven by a worm 47, which is splined to the shaft 18.

Mounted on both sides of the bearing sleeve 48 (see Figure 4) which is pressed into the hub 49 of the pulley 38, I provide connecting members 50 and 51, having a running fit over the extended portion of the sleeve 48. Members 50 and 51 are provided with extensions 52 and 53, which are bolted to bars 54 and 55, a swinging member is thus provided. Pivoted on the outward ends 56 and 57 of the bars 54 and 55 are bars 58 and 59, constituting a second member.

Figure 5:
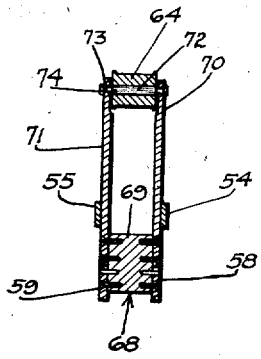
Figure 5 is a detail of the type of pulley construction as applied to the top pressure carrier for automatically keeping a belt under uniform tension regardless of the position of the carrier.

The bars 58—59 have each a slotted portion 60 adapted to receive the bearing 61 for idler pulley 62, and said bearing may be adjusted in the slot 60. The belt 63 passes over the drive pulley 38, the idler pulley 64 of the tensioning means, the idler pulley 62 and under the series of idler rolls 65 having extended pivots 66 adapted to float in slot 67 in the members 58 and 59. A block 68 (see Figure 5) is secured between the members 58 and 59, and has an extended portion 69 adapted to support upright members 70 and 71, between which the pulley 64 is mounted on a pivot 72 held in position by suitable reduced portion 73 and nuts 74.

From the description just given, it is clear as the thicknesses or layer of cartons or other material varies, the bars 58 and 59 carrying the idlers 65 will rise. Since the bars 54 and 55 are pivoted at point 56 these bars will also rise and pivot at the bearings 50 and 51. As the bars 58 and 59 rise, they will in turn raise the members 70 and 71 and with them the pulley 64, and take up any slack in the belt 63, automatically keeping thereby a uniform belt tension to the upper carrier pressure device.

Referring to Figure 3, it is to be noted that the drive pulley 38 is mounted far enough away from the traveling conveyor belt 27 so that it will at no time come in contact with the overlapping cartons or other material, but at the same time it will have sufficient belt contact to definitely drive the pressure belt 63 leaving the idler pulley 62 at the opposite end of the pressure belt free to float and adapt itself for layers of overlapping cartons, which will vary according to the length of the cartons and the speed at which they pass from the machine.

It must be noted that the overlapping distance will vary depending upon the length of the carton and the space between the cartons as they travel through the box machinery and on to the conveyor belt 27.

These cartons, particularly the smaller ones, have a tendency to spring open and therefore must be kept under an automatic yielding device between two traveling conveyors both having the same speed and both being positively driven. The belt or conveyor 27 is driven at a lower speed than that of the delivery rolls or feeding means 3, and belt 16, to cause lapping of the articles on the conveyor. The particular speed is determined by the length of the article, and is controlled by the character of the drive elements 19, 20 and 21, see Figure 1.

Suitable belt carrier mechanism 75 having a delivery belt 76 for guiding the cartons into the throat 78 between the pulley 38 and the conveyor 27 is provided. This, however, is of the usual construction and is therefore not described in detail.

The operation is as follows: The drums 15 and 26, both being positively driven, transmit motion to the conveyor 27 which is prevented from moving crosswise from the drum 26 by a guiding mechanism 77, see Figure 4. This consists of a member 78ª and 79, pivoted at 80 and 81, on a shaft 82 and carrying idler rolls 83 and 84. Elements 79—78ª have slots respectively indicated 86—85 whose centers of curvature lie in the axes of pivots 81—80. Suitable cap screws 88—87 pass through the slots and are adapted to clamp the elements 79—78ª in any adjusted position.

The conveyor 27 passes over the idler rolls 28, 29 and 30, but are adjusted to give proper pitch depending on the length of the cartons. The over-head pressure mechanism mounted in the member 35 is then adjusted towards the receiving end of the conveyor to the proper position depending on the length of the carton. This means that the members are moved bodily, the weight resting on the rolls 32 and 33, and rolled over the surface of the tubular frame 7. The rod 40 carries with it the roll 39 and the table 43 through the supporting members 41 and 42. The conveyor being empty, the belt 63 will lay in contact with the canvas conveyor 27. The mechanism described by the numeral 75 is then brought up into the proper position to guide the folded cartons into the throat 78 as hereinbefore described. The speed of the conveyor belt of the pressure device will be regulated so that the period of time required for the adhesive to permanently set will have lapsed through the interval that the cartons travel under the pressure belt and this variation floats pressure rolls 65.

Figure 6:
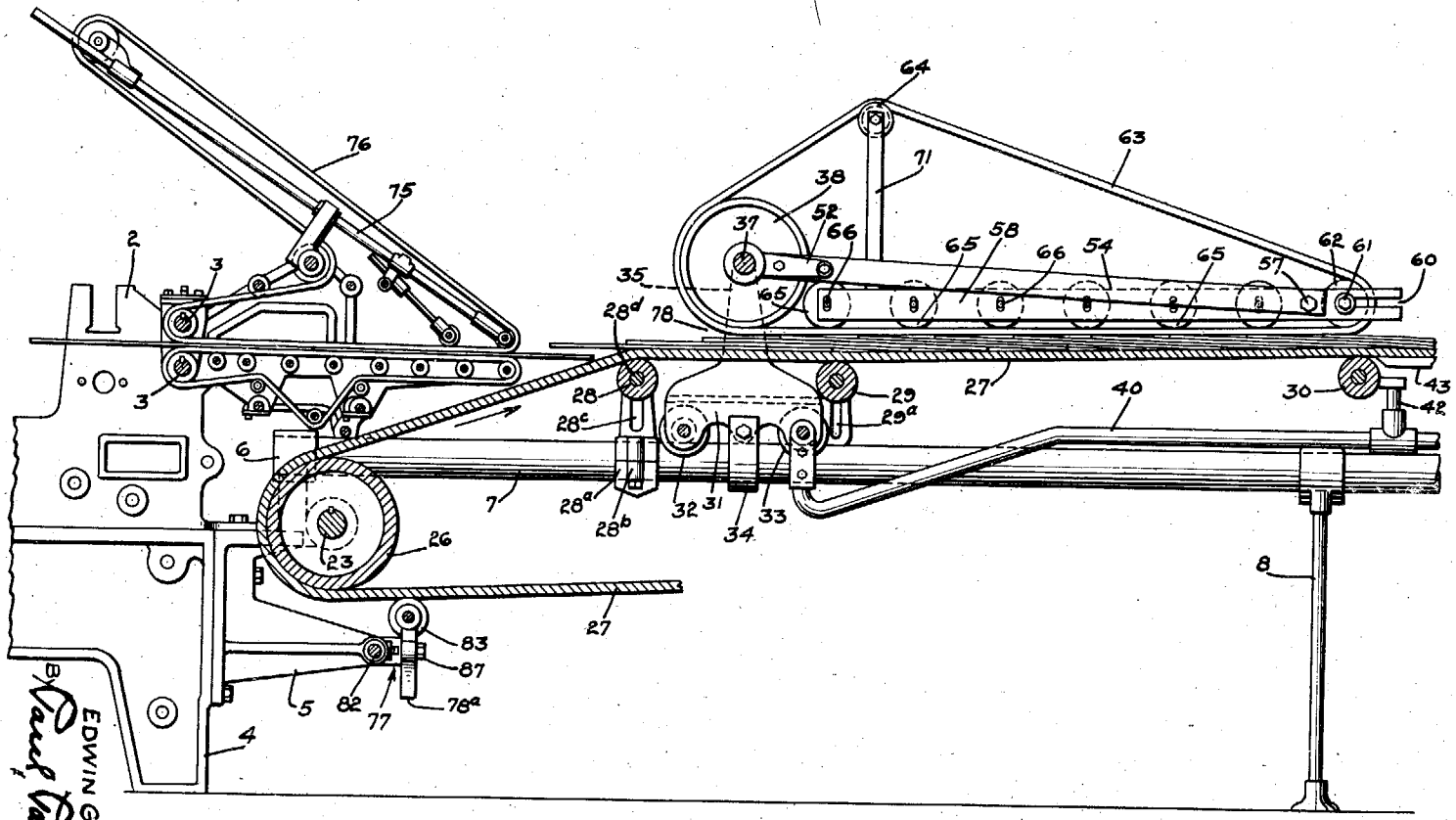
Figure 6 is a view similar to Figure 3 showing the mechanism adjusted for under-feed.

An important feature of this invention relates to means for regulating the pitch or receiving level of the receiving end of the conveyor 27, so that the rearmost blank of two consecutive blanks, can be fed under the forwardmost. The arrangement whereby the blanks can be underfed in the manner mentioned is quite important and permits the machine to handle blanks having a variety of different types of flaps. Sometimes the flaps are so positioned on the upper surfaces of the blanks that if the parts of the machine are set as shown in Figure 3, the rear carton will strike the flap or flaps of the cartons which lie on the upper run of the apron 27, and result in jamming or improper stacking. On cartons having "trick" cut-outs or peculiarly shaped locking flaps it is, therefore, important that the machine be adapted to deliver the rear carton beneath the forward carton. Figure 6 shows the machine set up so that the rear carton is delivered beneath the forward carton.

Figure 2:
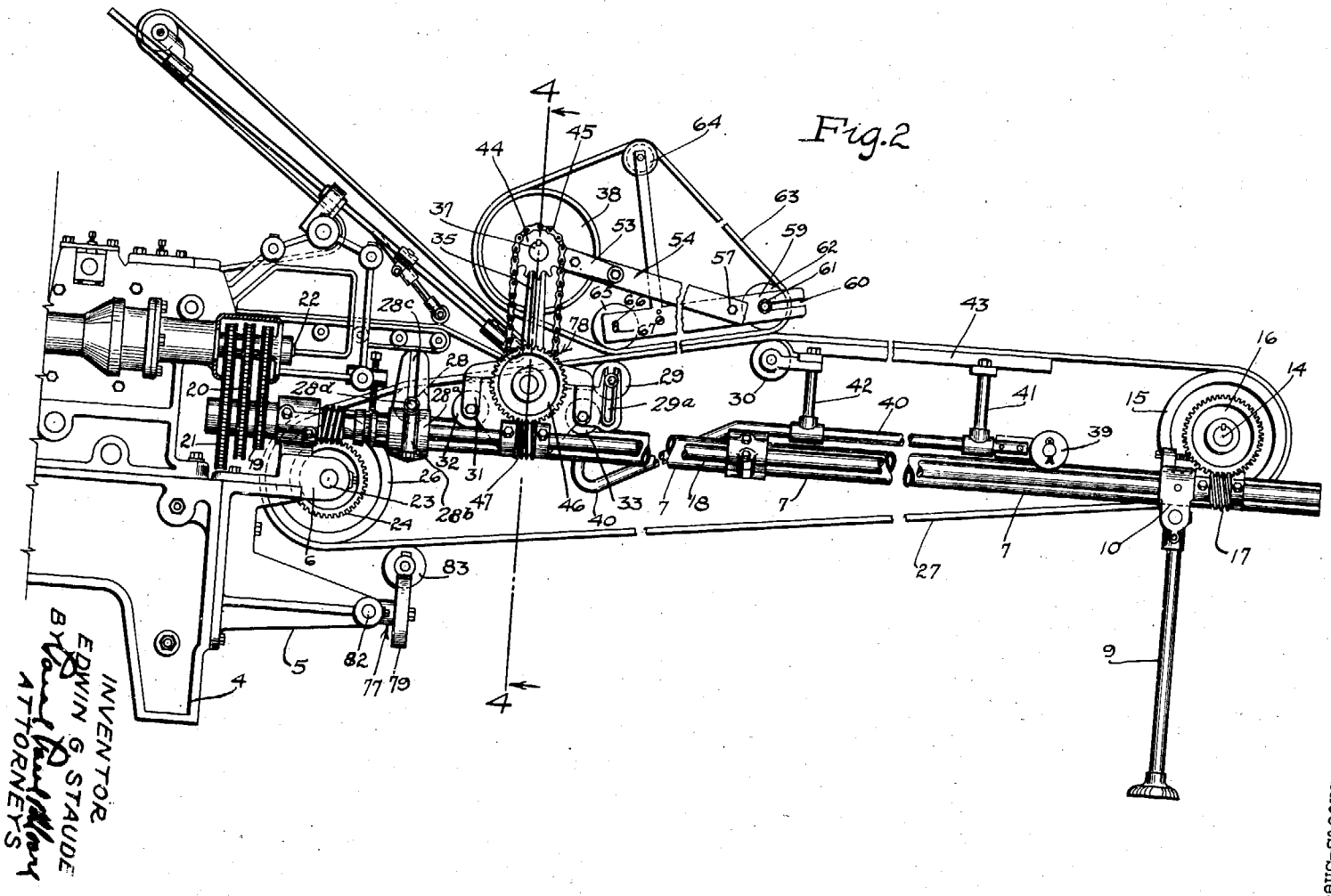
Figure 2 is a side elevation thereof.

If Figures 2 and 6 are compared, it will be seen that the roll 28 is adjustable longitudinally of the belt 27. The mount 28a for this roll has clamping means 28b and is slotted as at 28c to receive the roll shaft 28d for vertical adjustment. The vertical and longitudinal adjustments can be made independently of rolls 29 and 30. It will be further noted that roll 29 is independently vertically adjustable in slots 29a, see Figures 1 and 2, upon the frame 31. To change the upper run of belt 27 from the position shown in Figure 2 to that shown in Figure 6, the support for roll 28 is moved in direction of feed to the position shown in Figure 6, and the rolls 28 and 29 are vertically adjusted so that, as shown in Figure 6, their axes lie substantially in the same horizontal plane. Of course, various combinations and degrees of adjustments may be made to position the upper run of belt 27 as desired, relative to the forward ends of feed belts which are carried by rolls 3.

Another feature of the invention relates to the belt-supporting roller 29 movable with the mount 31, and vertically adjustable for adjusting the upper run of the belt 27 relative to the lower run of the belt 63, and relative to the vertically adjustable roll 28. An important feature also relates to the adjustability of the roll 28 both longitudinally and vertically independently of and with reference to the mount 31 and/or the roll 29. By these adjustments, portions of the upper run of belt 27 can be angularly disposed in various relations to the belt 63, and/or the feed belts carried by rolls 3.

Insofar as I am aware, I am the first to provide any means for so adjusting either the feed of the receiving belts, as to obtain under-feed, or to obtain either under or over-feed, and the first to provide means whereby these adjustments can be made relative to a presser belt (63), or in which a roll, functionally equivalent of roll 28, can be adjusted with reference to a belt (27) and to a mount which is the functional equivalent of adjustable mount 31.

Another feature of the invention relates to the inclined relation of the upper run 27 of the glued carton carrier mechanism to the feed level of the feeding means. The feeding means is arranged at a level most convenient for lifting a stack of blanks to feeding position, and a portion of the upper run of belt 27 is inclined upwardly and means is provided for adjusting the upper run so that this upwardly inclined portion merges into a portion which is at a level higher than that of the feeding level, and at such a level as to facilitate removal of the glued overlapped blanks. In other words, a feature is to provide a carrier mechanism for receiving the glued cartons including an over-head pressure carrier mechanism having belt 63 so arranged that the belts 27 and 63 operate at an incline, and deliver the glued cartons at a level which is a greater distance above the floor than that of the receiving end of the conveyor mechanism, and thus the operator may remove the finished work with the least amount of fatigue and discomfort. It is, therefore, unnecessary for the attendant to bend over or stoop to remove the cartons. It is impractical to raise the work line of the machine proper to accomplish this result because the machine would then be too high at the feeder end, and if made too high the operator would be under too great a strain in lifting the blanks to place them in the feeder. The inclined delivery arrangement, therefore, is of considerable advantage in that it can be adjusted to a level which is most convenient for removal of the blanks while the level of the feed end can be at such a lower level as is most convenient for placing the blanks in the feeder.

There is no intention to limit this invention entirely to the use of both overlapping and underlapping mechanisms in the same machine. For example, I may manufacture a machine designed only to obtain underlapping, or I may manufacture a machine which is adjustable to obtain either underlapping or overlapping feed.

I believe myself the first to provide any means by which the foremost blank of a series of consecutively fed blanks can be fed beneath a rearmost blank of a series of overlapped blanks which are moving on a conveyor, upon which conveyor the flat lapped articles are held by pressure means moving with the articles and conveyor, and applying pressure while the blanks are advanced.

I claim as my invention:

1. A delivery mechanism for paper box machinery comprising a lower conveyor belt, an upper presser belt, including drive and idler pulleys, pulleys for positively driving both of said belts, the presser belt idler pulley being mounted to swing from the presser belt drive pulley center, a truck for holding said presser belt in yielding contact with the overlapped boxes, said truck including one or more presser rollers being adapted to swing from a point near the presser belt idler pulley, and means for providing uniform belt tension on the presser belt regardless of its position in relation to the presser belt drive pulley.

2. A delivery mechanism for paper box machinery comprising a lower conveyor belt, an upper presser belt including drive and idler pulleys, pulleys for positively driving both of said belts, guide members for supporting the upper presser idler pulley in a manner to permit same to float or pivot around the upper presser belt drive pulley center, a truck member for holding said upper presser belt in yielding contact with the overlapped boxes, said member pivoted adjacent the presser belt idler pulley to permit the said truck to float, and adapt itself to different positions at the presser drive pulley end, and its opposite end being adapted to float with the said presser belt idler pulley and means for automatically paying out or taking up the slack in the upper presser belt as it accommodates itself to different thickness of overlapped cartons or paper articles.

3. A delivery mechanism for paper box machines comprising a lower conveyor belt, an upper presser belt including drive and idler pulleys, pulleys for positively driving said belts, worm and worm wheel connections for positively driving said pulleys, guide members for supporting the presser idler pulley to permit the said pulley to float or pivot around the upper presser belt drive pulley center, a truck member for holding said presser belt in yielding contact with the overlapped cartons or other articles, and pivoted at or near the presser belt idler pulley to permit the said truck to float at the presser drive pulley end, and adapted to float at the opposite end with the upper presser belt idler pulley.

4. A device of the class described including a conveyor and a shaft arranged there-adjacent, said shaft having a pulley, a frame comprising a first member swingable about the shaft toward and away from the conveyor, a second member having a pulley and further having a plurality of rollers, a belt arranged upon the pulleys and having a run opposed to the carrier and engaged by the rollers, said members being pivoted together at a point adjacent said last mentioned pulley.

5. A device of the class described including a conveyor and a shaft arranged there-adjacent, said shaft having a pulley, a frame comprising a first member swingable about the shaft toward and away from the conveyor, a second member having a pulley and further having a plurality of rollers, a belt arranged upon the pulleys and having a run opposed to the carrier and engaged by the rollers, said members being pivoted together at a point adjacent said last mentioned pulley, and said second member extending generally in a direction toward the drive pulley.

6. A device of the class described including a conveyor, and a shaft arranged thereabove, said shaft having a pulley, a floating frame comprising a first member swingable about the shaft toward and away from the conveyor, a second member having a pulley and further having a plurality of rollers, a belt arranged upon the pulleys and having a run opposed to the carrier and engaged by said rollers, said members being pivoted together at a point adjacent said last mentioned pulley, and said second member extending generally in a direction toward the drive pulley.

7. A device of the class described including a conveyor and a shaft arranged thereabove, said shaft having a pulley, a floating frame comprising a first member swingable about the shaft toward and away from the conveyor, a second member having a pulley and further having a plurality of rollers, a belt arranged upon the pulleys and having a run opposed to the carrier, and engaged by said rollers, said members being pivoted together at a point adjacent said last mentioned pulley and the second member extending generally in a direction toward the drive pulley, and means carried by the second member and engaging the opposite run of the belt in a manner to maintain the tension of the belt for all swinging positions of said members.

8. A device of the class described including a conveyor and a shaft arranged thereabove, said shaft having a pulley, a floating frame comprising a first member swingable about the shaft toward and away from the conveyor, a second member having a terminal pulley remote from the drive pulley and further having a plurality of rollers, a belt arranged upon the pulleys and having a run opposed to the carrier, said rollers engaging the inner surfaces of the run in a manner to maintain that portion of the run straight for a substantial distance, the rollers being adapted to adjust themselves in the second member in a direction toward and away from that run which they engage, said members being pivoted together at a point adjacent said terminal pulley, and the second member extending generally in a direction toward the drive pulley.

9. A device of the class described including a conveyor and a shaft arranged thereabove, said shaft having a pulley, a floating frame comprising a first member swingable about the shaft toward and away from the conveyor, a second member having a terminal pulley remote from the drive pulley and further having a plurality of rollers, a belt arranged upon the pulleys and having a run opposed to the carrier, said rollers engaging the inner surfaces of the run in a manner to maintain that portion of the run straight for a substantial distance, the rollers being adapted to adjust themselves in the second member in a direction toward and away from that run which they engage, said members being pivoted together at a point adjacent said terminal pulley and the second member extending generally in a direction toward the drive pulley, and means carried by the second member and engaging the opposite run of the belt in a manner to maintain the tension of the belt for all swinging positions of said frame members.

10. A delivery mechanism for paper box machinery comprising a lower conveyor belt and an upper presser belt, and means for supporting and driving said upper belt, comprising a frame adjustable in direction of feed, a drive shaft journaled in said frame, a presser belt driving element on said shaft, and automatically adjustable belt supporting means lying between the belt runs swingingly supported on said drive shaft.

11. A delivery mechanism for paper box machinery comprising a lower conveyor belt and an upper presser belt, and means for supporting and driving said upper belt comprising a frame adjustable in direction of feed, a shaft journaled in said frame and a presser belt driving element on said shaft, and a roll carried by said frame and supporting the upper run of the lower conveyor belt.

12. A delivery mechanism for paper box machinery comprising a lower conveyor belt, a frame, a drive shaft carried by said frame and arranged above the belt, said shaft having a pulley, means supported by the shaft and swingable thereon and having a presser belt cooperable with the first mentioned belt and driven by said pulley, pulleys arranged between the belt runs and carried by said shaft-supported means and holding said runs outwardly beyond straight lines tangent to the peripheries of at least two of said pulleys.

13. A delivery mechanism for a paper box machine comprising a lower conveyor belt, a drive shaft above the lower conveyor belt, supporting means swingable upon the shaft, belt-tensioning means swingable on said supporting means, a drive pulley on the shaft and a pulley on said tensioning means, said pulleys supporting an upper presser belt, said drive shaft forming the sole support for said supporting and tensioning means.

14. A delivery mechanism for a paper box machine comprising a lower conveyor belt, a drive shaft above the lower conveyor belt arranged transversely to line of feed, supporting means swingable upon the shaft, belt-tensioning means swingable on said supporting means, a drive pulley splined on the shaft and a pulley on the supporting means, said pulleys supporting an upper presser belt, and said drive shaft forming the sole support for said supporting and tensioning means.

15. A mechanism for the purpose described including a lower conveyor belt, and an upper belt cooperative therewith for feeding blanks in overlapped condition, and means acting upon the inside of both runs of the upper belt for automatically compensating for variation in belt tension due to different thicknesses of the overlapped blanks and for maintaining a substantially linear condition of the lower run of the upper belt.

16. A mechanism for the purpose described including a full width single lower conveyor belt, and a narrower upper presser belt, and means for automatically compensating for variation in belt tension due to different thicknesses of overlapped material being fed and for maintaining a substantially linear condition of the lower run of the upper belt, said means being floatingly disposed between and engaging the upper and lower runs of said upper belt, said upper belt being mounted in a supporting driving means adjustable in direction of travel of overlapped material being fed.

17. In a device of the class described, means for feeding blanks, a belt arranged to receive the blanks from the feeding means, and means by which the upper run of the belt can be adjusted to be operatively disposed above or below the feeding level of the feeding means.

18. A delivery mechanism for advancing in lapped relationship flat articles received from a feeding means, said delivery mechanism being adapted for either overlap or underlap delivery, including a lower carrier belt and an upper pressure device between which the said articles are received and advanced, and means over which flat articles pass, said means being located between the rearmost portion of said upper pressure device and said feeding means for raising the rear of the forward article to permit overhanging thereof and to cause the following article to be fed therebeneath.

19. In a device of the class described, means for feeding blanks, a belt arranged to receive the blanks from the feeding means, and means by which the upper run of the belt can be adjusted to be operatively disposed above or below the feeding level of the feeding means, and means adjustable with respect to the upper run of the belt for pressing overlapped blanks against said upper run.

20. A blank feeding mechanism, a receiving belt to which said feed mechanism delivers, a presser belt cooperative with the receiving belt to feed the blanks after delivery by the feeding means, a mount for said presser belt which is adjustable in direction of feed, a vertically adjustable roll on said mount adapted to support the upper run of the receiving belt, and a second supporting roll for said receiving belt arranged nearer said feeding means than the first mentioned roll, and vertically adjustable for raising and lowering the upper run of said belt, and a mount for said last mentioned roll adjustable in direction of feed, independently of said presser belt mount.

21. A blank feeding mechanism, a receiving belt to which said feed mechanism delivers, a presser belt cooperative with the receiving belt to feed the blanks after delivery by the feeding means, a mount for said presser belt which is adjustable in direction of feed, a vertically adjustable roll on said mount adapted to support the upper run of the receiving belt, and a second supporting roll for said receiving belt vertically adjustable for raising and lowering the upper run of said belt, and a mount for said last mentioned roll adjustable in direction of feed.

22. A blank feeding mechanism, a roller-supported receiving belt to which said feeding mechanism delivers, an additional supporting roll for said receiving belt, and means by which it is adjustable for positioning a portion of the upper run of the receiving belt which is nearer the feeding mechanism below the delivery level of that mechanism, and for positioning a more forward portion of said upper run at a level above that of the feeding level of said feeding mechanism.

23. A device of the class described including means for feeding folded boxes, a conveyor belt upon which glued flattened cartons are delivered in overlapped relation, a pressure belt adapted to engage the overlapped cartons and move with them, said belts being inclined upwardly in direction of feed and being adapted to deliver the cartons at a level higher than that of the feed level of the feeding means, and means adjustable in direction of travel of the glued flattened cartons for supporting and driving said pressure belt.

24. A device of the class described including means for feeding folded boxes, a conveyor belt upon the upper run of which glued flattened cartons are delivered in overlapped relation, a pressure belt adapted to engage the overlapped cartons and move with them, said belts being inclined upwardly in direction of feed and the upper run of the conveyor belt being adapted to deliver the cartons at a level higher than that of the feed level of the feeding means, and means by which the upper run can be adjusted to provide portions at different inclines successively less steep.

25. A delivery mechanism for paper working machinery comprising feeding means, a belt for receiving blanks delivered from the feeding means in overlapped condition and having a portion upwardly and forwardly inclined in direction of feed and merging into another portion which is above the feeding level of the feeding means, the point of mergence being spaced from the delivery end of the feeding means a distance less than the length of the fed article in direction of feed, and means for holding the blanks in overlapped relation on the receiving belt.

26. A delivery mechanism for paper working machinery comprising feeding means, a belt for receiving blanks delivered from the feeding means and having a portion upwardly and forwardly inclined in direction of feed and merging into another portion which is above the feeding level of the feeding means, the point of mergence being spaced from the delivery end of the feeding means a distance less than the length of the fed article in direction of feed, and means for varying the level of said run to bring the last mentioned run portion also below the feeding level of said feeding means.

27. A device of the class described including means for feeding folded boxes, a conveyor upon which the folded boxes are delivered in lapped relation, and means adjustable to obtain either underlapped or overlapped delivery of the folded boxes to the conveyor.

28. A delivery mechanism for paper gluing and folding machines comprising means for feeding flat articles, a carrier belt arranged to receive the articles from the feeding means, a pressure device adapted to coact with the upper stretch of said carrier belt to hold articles in lapped relation while being moved, and means located between the rearward-most portion of said upper pressure device and said feeding means for operatively adjusting the upper run of said carrier belt at a point near said feeding means to raise the rear end of a forward article which is in lapped relation on said belt, and obtain underneath feeding of the following article.

29. A delivery mechanism for handling flat articles which includes, means between which flat articles are advanced in lapped condition, means for applying yielding pressure to said lapped articles while on said advancing means, means for successively feeding articles to and between said advancing and pressure means, and means located between the rearward-most portion of said pressure device and said feeding means and by which each forwardmost fed article of said last mentioned means is caused to be delivered in lapped relation with and beneath a corresponding rearmost article which is on said advancing means.

30. A delivery mechanism for handling boxes of the knock-down type in knock-down condition, which boxes have "trick" cut-outs or peculiarly shaped locking flaps which are uppermost as the boxes are fed, comprising, yielding means between which the boxes are advanced in overlapped relationship, means for applying flattening pressure to the overlapped boxes while on said yielding advancing means, means for successively feeding boxes to and between said yielding advancing and pressing means, and means located between the rearward-most portion of the said upper pressure device and said feeding means, and by which each forwardmost fed box is delivered in lapped relation with and beneath a corresponding rearmost box, which is on said advancing means, whereby jamming due to said "trick" cut-outs and flaps is prevented.

31. A delivery mechanism including, feeding means, yielding means including a lower carrier belt and an upper pressure device between which the articles are received from the feeding means and thereafter advanced in lapped relation, and means by which the rear end of a forward-most article which is on said carrier belt is raised to permit underneath feeding of a following article by said feeding means, said means acting only at a point rearwardly spaced in direction of feed from said upper pressure device.

32. A delivery mechanism including, a feeding means, yielding means including a lower carrier belt and an upper pressure device between which the articles are received from the feeding means and thereafter advanced, said upper pressure device having its rearmost portion spaced from the forwardmost portion of the feeding means, and means arranged intermediately of said feeding means and upper presser device and acting for raising the rear of an article on said carrier belt to permit underneath feeding of a following article while said following article is being acted on by the feeding means.

33. A delivery mechanism for advancing in lapped relationship articles received from a feeding means, yielding means including a lower carrier belt, and an upper pressure device between which the articles are received and advanced, said upper pressure device having its rearmost portion spaced forwardly of the forwardmost portion of the feeding means, and means arranged forwardly of said feeding means and acting for tilting the rear of a forward article to permit underneath feeding of the following article while said following article is being acted on by the feeding means, said means acting to tilt said forward article before it is acted upon by said upper pressure device.

34. A device of the class described including means for feeding flat articles, a conveyor to which the articles are delivered and upon which they are lapped and thereafter advanced in lapped relation, and means by which a following article is caused to assume either underlapped or overlapped relation with a forward article during transfer of said following article to said conveyor.

35. A device of the class described including, means for feeding flat articles, a conveyor to which the feeding means delivers and upon which the articles are advanced in lapped relationship and means associated only with the upper run of said conveyor to obtain either underlap or overlap arrangement of the articles on the conveyor.

36. In a device of the class described, means for feeding flat objects, a conveyor arranged to receive the objects from the feeding means, an upper pressure device between which and the conveyor the objects are received and advanced in lapped relation, and means acting on a rearmost object which is on the conveyor for tilting the same to permit underneath feeding of the following object by the feeding means, and acting before the forwardmost portion of the object being tilted is positively acted upon by said upper pressure device.

37. A mechanism for advancing in lapped relationship flat articles received from a feeding means including a lower carrier belt to which the articles are delivered and advanced in lapped relation, and means applying force to tilt a rearmost forward article which is on the belt to permit underneath feeding of the forward end of the following article by the feeding means.

38. In a device of the class described, means for feeding flat objects, a conveyor arranged to receive the flat objects from the feeding means, an upper pressure device between which and the conveyor the objects are received and advanced in lapped relation, and means by which the forward portion of an article being fed can be caused to pass beneath the rear portion of a forward article on said conveyor, said means acting before the forwardmost portion of said forward article is positively acted upon by said upper pressure device, whereby to avoid weaving of the overlapped articles after positive pressure is applied.

39. A device of the class described including means for feeding flat articles, advancing means to which the articles are transferred including compression means which act upon the articles after transfer thereto, and means for causing the forward portion of a rear article to be delivered under the rear portion of a forward article and acting after said forward article is on said advancing means but before action thereon by said compression means.

40. A delivery mechanism for advancing articles received from a feeding means, including a lower carrier belt and an upper pressure device between which said articles are received and advanced, and lap-controlling means over which the flat articles pass adjustable to obtain underlap or overlap of a rear with a forward article, said means being located rearwardly of the rearmost portion of said upper pressure device, and said carrier belt and upper pressure device being so related at their receiving ends that the articles are acted upon by said rearwardly located means before they are pressed by the pressure device.

EDWIN G. STAUDE.